United States Patent [19]

Oswell

[11] 4,411,285

[45] Oct. 25, 1983

[54] DEMAND VALVE

[75] Inventor: Hugh H. B. Oswell, Hexham, England

[73] Assignee: Submarine Products Limited, Northumberland, England

[21] Appl. No.: 264,401

[22] Filed: May 18, 1981

[30] Foreign Application Priority Data

May 20, 1980 [GB] United Kingdom ............... 80166979
Jun. 27, 1980 [GB] United Kingdom ................. 8021211

[51] Int. Cl.[3] ......................... G05D 11/00; A62B 7/04

[52] U.S. Cl. .................................... 137/112; 137/113; 137/271; 137/510; 128/204.26; 128/205.24

[58] Field of Search ...................... 128/201.27, 201.28, 128/204.26, 204.28, 205.24, 910; 137/510, 493.1, 493.2, 493.6, 112, 113, 271; 251/61.1

[56] References Cited

U.S. PATENT DOCUMENTS 2,929,376 3/1960 Kemper .......................... 128/204.26
3,429,329 2/1969 Berkley ........................... 137/204 X

*Primary Examiner*—Henry J. Recla
*Attorney, Agent, or Firm*—Birch, Stewart, Kolasch & Birch

[57] ABSTRACT

A diver's demand valve has a diaphragm 15 with a centrally located rigid element 16 which pivots with a lever effect on an eccentric port 22 upon establishing an operative pressure difference across the diaphragm to open and close the valve. An abutment surface 30 prevents unwanted pivoting and a spring 27 keeps the rigid element 16 seated except during operative pressure differences.

For a diver's exhalation demand valve an "anti-squeeze", safety, flap valve 34 may be provided in the rigid element 16.

12 Claims, 5 Drawing Figures

DEMAND VALVE

FIELD OF THE INVENTION

This invention relates to demand valves and, more particularly, is concerned with valves which open and close automatically in response to movements of a flexible diaphragm with changes of pressure across the diaphragm. Such demand valves find application in breathing equipment particularly for divers.

BACKGROUND OF THE INVENTION

According to one previous proposal, a valve member which is urged by a helical spring into a seating disposition with respect to a valve port is displaced from said seating disposition, to open the valve, upon translational movement of a diaphragm connected to the valve member by a valve stem or pivotable link which extends perpendicular to the valve seating surface. See U.S. Pat. No. 3,481,333 to Garrison. While such arrangements can provide a useful lever ratio in which a small pressure difference across the diaphragm can provide a large force to unseat the valve member, nevertheless the presence within the valve of moving parts and mechanical connections introduces source of unreliability, which are of course extremely undesirable when the correct functioning of the valve is essential to sustain life.

It has also been proposed to use as demand valves in breathing apparatus relatively simple diaphragm valves in which translational movement of the diaphragm in response to pressure differences across it causes a closure surface on the diaphragm to move between a disposition in which it is seated on a valve port and an open disposition in which it is spaced from the valve port. See U.S. Pat. No. 4,161,947 to Copson. Although the absence in such valves of a link or valve stem as mentioned above may endow the valves with greater reliability than the demand valves first above described, these latter valves lack a lever ratio for providing the desired sensitivity of operation.

SUMMARY OF THE INVENTION

The present invention has an one object to ameliorate the aforementioned disadvantages and accordingly provides a valve comprising a chamber provided with an inlet port and an outlet port, a flexible diaphragm closing said chamber against an external pressure and including a substantially rigid, planar element comprising a port closure surface which seats on one only of said inlet and outlet ports to close said one port, the diaphragm and one port being so disposed relative to one another so that the port closure surface contacts the port at a location spaced from the centre of pressure of the diaphragm. Whereby, establishment of an operative difference of pressure across the diaphragm causes the element to pivot so as to unseat the closure surface and thereby open said one port.

While the substantially rigid element will generally pivot about a point on the periphery of the port on which the closure surface seats, nevertheless there may be occasions when it will be convenient for the element to pivot about some other point or axis within the chamber.

It will usually, but not necessarily always, be necessary to provide at least one abutment surface for the rigid element to prevent unwanted pivotal movements thereof. For example, when the valve is employed as a driver's exhaust demand valve, an abutment surface may be provided within the chamber to prevent pivotal movement of the rigid element into the chamber when the pressure of gas within the chamber is reduced, for example, when the diver inhales.

BRIEF DESCRIPTION OF THE DRAWINGS

For a better understanding of the invention, and to show more clearly how the same may be carried into effect, reference will now be made, by way of example, to the accompanying drawings in which.

DETAILED DESCRIPTION

Figure 1:
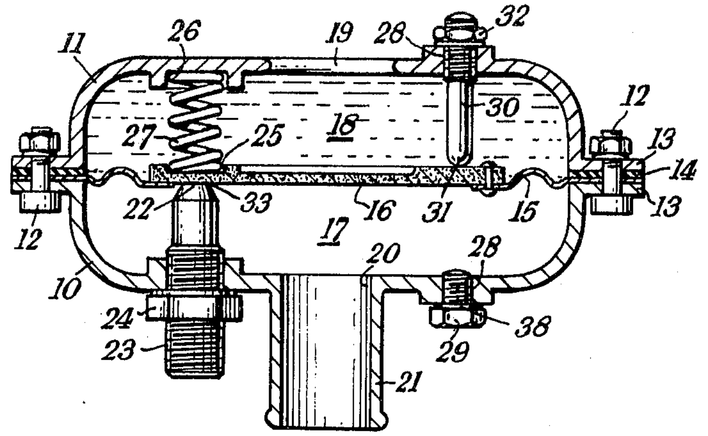
FIGS. 1, 2 and 3 are median sections across a first embodiment of demand valve according to the invention.
Figure 2:
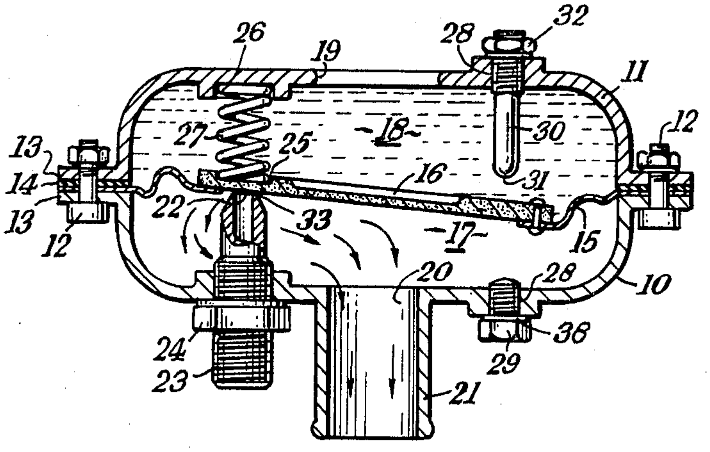
Figure 3:
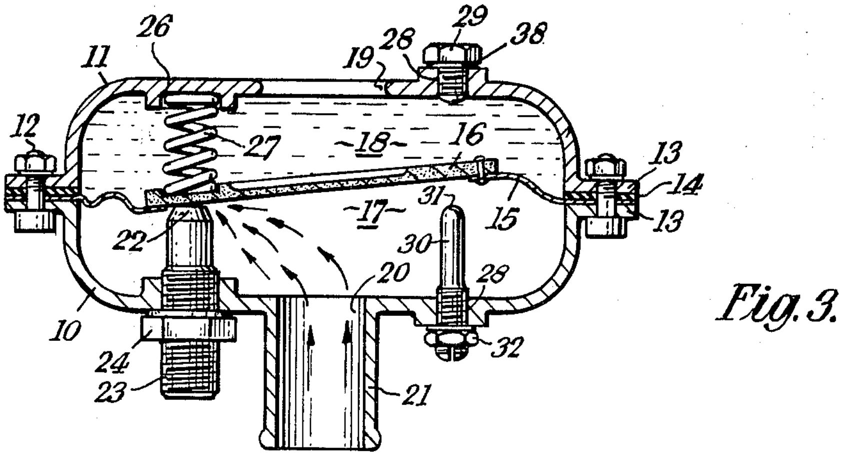

The valve shown in FIGS. 1, 2 and 3 of the drawings has a housing made up of an inner housing half 10 and an outer housing half 11 which are secured together by threaded fixing means 12 through flanges 13 on the housing valves. Clamped between the flanges 13 is a gasket 14 and a diaphragm 15 which includes a centrally located, hard synthetic polymeric amide, e.g. nylon (trade mark), valve element 16 and which extends across the housing thereby to define a valve chamber 17 within the housing. A volume 18 within the outer housing half 11 communicates with the environment surrounding the housing through a port 19. The valve chamber 17 is provided with a port 20 from which a spigot 21 extends, and with a further port 22 defined by one end of a spigot 23 whose external surface is threaded to engage with a corresponding tapped hole in the housing. The position of the port 22 is determined by screwing the spigot into the tapped hole in the wall of the chamber, and locking it in the desired position with a lock nut 24. Such sealing as is necessary is provided by a gasket clamped between the nut 24 and the wall of the housing half 10.

The valve member 16 is provided with a recess 25 and the housing half 11 with the corresponding recess 26 to receive opposed ends of a helical spring 27 which acts to urge a closure surface, which is the lower surface of the valve element 16, into contact with the periphery of the port 22 thereby seating on it.

The housing is provided with an opposed pair of threaded apertures 28 in one of which a threaded plug 29 is engaged and the other of which a threaded stop member 30 is located. A seal 38 is provided around the plug 29 to render gas-tight the aperture 28 in which the plug is located and a lock nut 32 is provided on the threaded length of the stop member 30 to fix in a chosen position, relative to the valve element 16, the free end 31 of the stop member 30. This free end 31 is so located that, in the presence of a pressure differential across the diaphragm 15 which is such as to press the valve element 16 into contact with the free end, it will prevent any unseating of the valve closure surface from the port 22 which might otherwise occur through pivoting of the valve member 16 about the periphery of the port 22.

FIGS. 1 and 2 show the valve in use as a diver's inhalation demand valve. The spigot 21 is connected to the diver's face mask (not shown), i.e. port 20 is an outlet port of the valve, and the spigot 23 is connected to a source of breatheable gas under pressure i.e. port 22 is an inlet port of the valve. In a dive, the volume 18 is full of water which presses on the diaphragm 15 including the valve element 16. This pressure is resisted by the pressure within the chamber 17 of the gas which the diver is breathing. The spring 27 presses the closure surface of the valve element 16 on to the outlet port 22 so that it seats on it, and when the pressure across the diaphragm 15 is balanced, the valve element 16 contacts the tip 31 of the stop member 30.

Upon inhalation, the pressure in the chamber 17 falls and a pressure differential across the diaphragm 15 is established. The valve element 16 of the diaphragm 15 moves to relieve the pressure differential by tilting in the manner shown in FIG. 2. It will be appreciated that a lever effect is in play because the distance between the line of action of the force provided by the spring 27 and the point 33 on the periphery of the port 22 about which the valve element 16 pivots is much smaller than the distance between the pivot point and the line of action of the force on the valve element 16 through the centre of pressure of the diaphragm caused by the pressure differential across the diaphragm 15. Thus, a relatively strong spring 27 can be used to ensure reliable seating which is nevertheless broken by a relatively small pressure difference across the diaphragm 15. It is to be noted that the closure surface on the valve element 16 remains seated on the port 22 when the pressure in the chamber 17 is greater than that in the volume 18 because here the tip of the stop member 30 prevents tilting movement of the valve element 16 about the periphery of the port 22 to relieve the pressure differential. The resilience of the spring 27 is high enough to ensure that, in use, the pressure in the chamber 17 is never sufficient to cause pivoting of the valve element 16 about the tip of the stop member 30 with consequent unseating of the closure surface from the port 22.

FIG. 3 shows the application of the valve as an exhalation demand valve for a diver. Here, the spigot 23 is connected to an exhaust gas treatment system with the pressure at the port 22 (outlet port) somewhat less than ambient. Thus, with the volume 18 full of water there is a pressure difference across the valve element 16 to seat on the port 22. Accordingly, it may be possible to dispense with the spring 27.

The positions of the plug 29 and stop member 30 are reversed from the FIG. 2 positions to prevent pivotal movement of the valve element 16 about the periphery of the port 22 when the pressure within the chamber 17 is less than that in the volume 18 and so prevent opening of the valve when the diver inhales. On the contrary, the valve opens when the diver exhales and increases the pressure within the chamber 17 above that of the water within the space 18. It is to be noted that in this application of the valve the lever ratio is somewhat greater because the valve element 16 pivots about the edge of the port 22 remote from the pressure centre of the diaphragm 15 rather than about a point on the periphery adjacent the pressure centre.

While the valve shown in the drawings can be employed both as a diver's inhalation demand valve and exhalation demand valve by repositioning of the plug 29 and stop member 30, the invention is not limited to such multi-purpose valves. Also, the single stop member 30 may be replaced by a plurality of stop members. For example, the embodiment of FIGS. 4 and 5 has two stop members.

Figure 4:
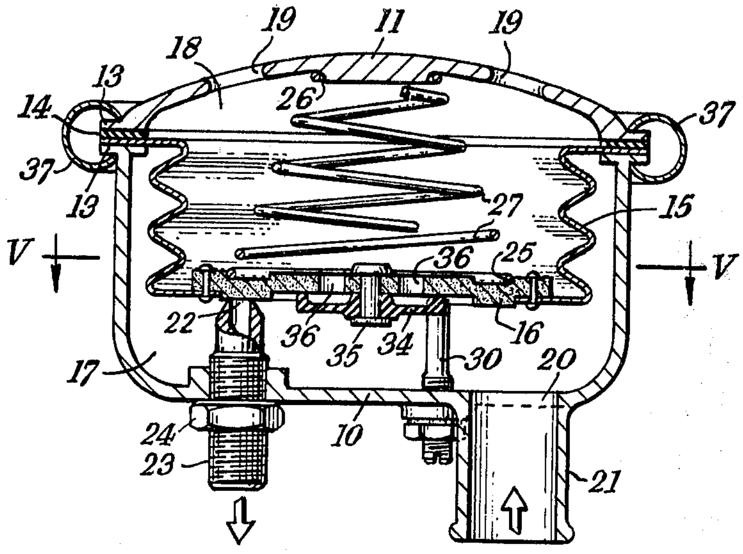
FIG. 4 is a median section across a second embodiment of demand valve according to the invention.
Figure 5:
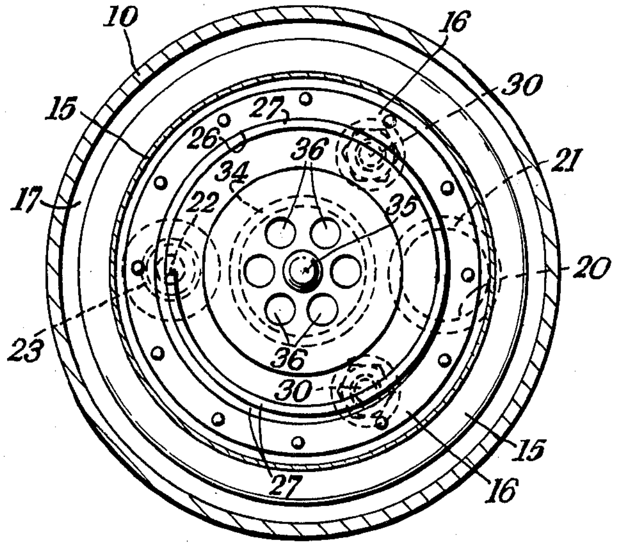
FIG. 5 is a section along the plane V—V of the valve of FIG. 4.

The valve shown in FIGS. 4 and 5 is closely similar to the embodiment described immediately previously with reference to FIG. 3, and like reference numerals are used to identify equivalent features and valve components.

The two stop members 30 of the valve are not in the plane of the drawing but rather one on either side of it so that the spring 27 urges the valve member 16 to seat on a triangle formed by the two stop members 30 and the spigot 23.

A safety valve disc 34 is secured by a stud 35 to the centre of the valve member 16 and occludes a plurality of small holes 36 in the member 16. In the event of imperfect seating of the member 16 on the port 22 the pressure within the chamber 27 may fall low enough to put the diver in danger. This is relieved by flow of water through holes 36 and out of the chamber 17 through the port 22. In normal operation of the valve, however, the safety valve member 34 will prevent flow of any fluid through holes 36.

The inner 10 and outer 11 casing halves are secured together with a clamping ring 37 which encircles the flanges 13 on the casing halves. The spring 27 is accommodated around a boss 38 on the outer casing and in a rebate 25 around the circumference of the valve member 16.

The valve of FIGS. 4 and 5 is particularly useful as a diver's exhalation demand valve and reduces the risk of injury to the diver (the so-called "squeeze") in the event of failure of the valve element to seat properly after exhalation. Thus, should the valve element 16 fail to seat and a "squeeze" is developing, the safety valve will open to relieve the partial vacuum by intake of water, which will be drawn out of the chamber through the outlet port.

Preferably, the safety valve is located centrally of the valve element, as shown in the drawings, where it is acted upon by the full pressure difference across the diaphragm and has the additional advantage that random changes of angular position of the diaphragm relative to the casing and ports, for example with successive dis-assemblies and re-assemblies of the valve, can be permitted, for they need not affect valve performance.

I claim:

1. A valve comprising:

a housing;

a flexible diaphragm operatively positioned within said housing for forming first and second chambers;

said first chamber being in communication with an external pressure source;

a first port and a second port being operatively positioned within said second chamber;

said flexible diaphragm including a substantially rigid, planar portion affixed thereto and forming a port closure surface for engaging and closing said first port, said flexible diaphragm and said first port being so disposed relative to one another that the port closure surface contacts the first port at a location spaced from the centre of pressure of the flexible diaphragm, whereby establishment of an operative difference of pressure across the flexible diaphragm causes the flexible diaphragm to pivot so as to unseat the closure surface and thereby open said first port; and low pressure relief safety valve means including a valve member mounted on the planar portion and movable in response to a pressure difference there-across to relieve excessively low pressures in the second chamber by permitting said external pressure in said first chamber to flow into the second chamber.

2. A valve according to claim 1, wherein said first port is an inlet port and said second port is an outlet port.

3. A valve according to claim 1, wherein said first port is an outlet port and said second port is an inlet port.

4. A valve as claimed in claim 1, wherein the rigid planar portion pivots about a point on the periphery of the first port on which the closure surface seats.

5. A valve as claimed in claim 4, wherein said first port is provided as an open end of a spigot mounted to said housing defining said second chamber.

6. A valve as claimed in claim 5, wherein the spigot is threadably engaged with the housing and means are provided to fix the spigot in a chosen position relative to the housing.

7. A valve as claimed in claim 4, including at least one abutment surface being in engagement with the rigid planar portion when the closure surface is seated, to prevent unwanted pivotal movements of the rigid element.

8. A valve as claimed in claim 1, wherein the rigid planar portion is located within and spaced from the periphery of the diaphragm.

9. A valve as claimed in claim 8, wherein the rigid planar portion is circular and is located centrally within the diaphragm which has a circular circumference.

10. A valve as claimed in claim 9, wherein the diaphragm comprises an annulus of flexible, elastic material surrounding, and secured to the periphery of, the rigid planar portion.

11. A valve as claimed in claim 1, including spring means to bias the rigid planar portion into a position in which it seats on the said first port.

12. A valve as claimed in claim 1, wherein the safety valve comprises an elastomeric flap valve member.

* * * * *